US010040983B2

(12) United States Patent
Yoshikawa et al.

(10) Patent No.: US 10,040,983 B2
(45) Date of Patent: Aug. 7, 2018

(54) DISPERSION SOLUTION FOR DRILLING AND METHOD OF EXTRACTING UNDERGROUND RESOURCES USING THE DISPERSION SOLUTION

(71) Applicant: TOYO SEIKAN GROUP HOLDINGS, LTD., Tokyo (JP)

(72) Inventors: Seishi Yoshikawa, Kanagawa (JP); Tsutaki Katayama, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/649,947

(22) PCT Filed: Dec. 12, 2013

(86) PCT No.: PCT/JP2013/083305
§ 371 (c)(1),
(2) Date: Jun. 5, 2015

(87) PCT Pub. No.: WO2014/092146
PCT Pub. Date: Jun. 19, 2014

(65) Prior Publication Data
US 2015/0299553 A1  Oct. 22, 2015

(30) Foreign Application Priority Data

Dec. 12, 2012 (JP) ................................. 2012-271083
Feb. 15, 2013 (JP) ................................. 2013-028031
Aug. 1, 2013 (JP) ................................. 2013-160063

(51) Int. Cl.
*C09K 8/68* (2006.01)
*C09K 8/12* (2006.01)
*C09K 8/08* (2006.01)
*E21B 37/06* (2006.01)

(52) U.S. Cl.
CPC .................. *C09K 8/12* (2013.01); *C09K 8/08* (2013.01); *E21B 37/06* (2013.01)

(58) Field of Classification Search
CPC ...... C09K 2208/08; C09K 8/035; C09K 8/40; C09K 8/68; C09K 2208/26; C09K 2208/32; C09K 8/12; C09K 8/42; C09K 8/516; C09K 8/524; C09K 8/528; C09K 8/70; C09K 8/882; C09K 2208/12; C09K 2208/30; C09K 8/36; C09K 8/467; C09K 8/502; C09K 8/5083; C09K 8/512; C09K 8/536; C09K 8/685; C09K 8/88; C09K 8/90; C09K 8/92; C09K 2208/00; C09K 2208/22; C09K 2208/24; C09K 2208/28; C09K 8/03; E21B 21/003; E21B 33/138; E21B 43/26; E21B 43/267; E21B 43/16; E21B 43/25; E21B 33/134; E21B 33/14; E21B 37/00; E21B 37/06; E21B 43/08; E21B 43/103; E21B 43/105; E21B 43/108

See application file for complete search history.

(56) References Cited

U.S. PATENT DOCUMENTS

| | | |
|---|---|---|
| 5,813,466 A | 9/1998 | Harris et al. |
| 7,219,731 B2 | 5/2007 | Sullivan et al. |
| 7,833,950 B2 | 11/2010 | Willberg et al. |
| 2004/0231845 A1 | 11/2004 | Cooke, Jr. |
| 2005/0027081 A1 | 2/2005 | Okushita et al. |
| 2007/0204997 A1* | 9/2007 | Harris ...................... C09K 8/03 166/311 |
| 2010/0056401 A1 | 3/2010 | Samuel et al. |
| 2010/0086718 A1 | 4/2010 | Yoshikawa et al. |
| 2010/0126723 A1 | 5/2010 | Ali et al. |
| 2011/0034582 A1 | 2/2011 | Dahling |
| 2011/0155371 A1* | 6/2011 | Panga ...................... C09K 8/80 166/278 |
| 2011/0201069 A1* | 8/2011 | Yoshikawa ............ C08J 11/105 435/145 |
| 2012/0329683 A1 | 12/2012 | Droger et al. |
| 2013/0184415 A1 | 6/2013 | Yoshikawa et al. |
| 2013/0252584 A1 | 9/2013 | Abe et al. |
| 2014/0000890 A1 | 1/2014 | Sun et al. |
| 2015/0087560 A1 | 3/2015 | Abe et al. |
| 2015/0126414 A1 | 5/2015 | Abe et al. |

FOREIGN PATENT DOCUMENTS

| | | |
|---|---|---|
| CN | 104508239 | 4/2015 |
| EA | 008140 | 4/2007 |
| EA | 200700535 | 8/2007 |

(Continued)

OTHER PUBLICATIONS

Extended European Search Report issued in Patent Application No. 13862865.6, dated Jul. 29, 2016.
U.S. Appl. No. 14/649,971 to Seishi Yoshikawa, filed Jun. 5, 2015.
International Search Report issued in PCT/JP2013/083305 dated Mar. 11, 2014.
Chinese Office Action issued in Counterpart Patent Appl. No. 201380065362.2, dated Nov. 3, 2016, along with an english translation thereof.
Russian Office Action issued in Patent Application No. 2015128009, dated Dec. 28, 2016.
Japanese Office Action issued in Patent Appl. No. 2013-262407, dated Jan. 30, 2018, along with an english translation thereof.

(Continued)

*Primary Examiner* — Kumar R Bhushan
(74) *Attorney, Agent, or Firm* — Greenblum & Bernstein, P.L.C.

(57) ABSTRACT

A dispersion solution for drilling obtained by dispersing, in an aqueous medium, a hydrolysable resin material that contains a resin that is hydrolysable but sparingly and a hydrolysable resin that accelerates the decomposition of esters. The dispersion solution for drilling exhibits a highly hydrolysable capability despite of using an inexpensive hydrolysable resin material, and can be favorably used for extracting resources relying on a well drilling method such as hydraulic fracturing method, rotary drilling method or riserless drilling method.

6 Claims, 1 Drawing Sheet

(56) References Cited

FOREIGN PATENT DOCUMENTS

| | | |
|---|---|---|
| EA | 200701378 | 6/2008 |
| JP | 02-286781 | 11/1990 |
| JP | 2005-97590 | 4/2005 |
| JP | 2010-116482 | 5/2010 |
| JP | 2010-138389 | 6/2010 |
| JP | 2011-006615 | 1/2011 |
| JP | 2011-511871 | 4/2011 |
| RU | 2373250 | 11/2009 |
| WO | 2004/037946 | 5/2004 |
| WO | 2008/038648 | 4/2008 |
| WO | 2008/068645 | 6/2008 |
| WO | 2010/055903 | 5/2010 |
| WO | 2012/046709 | 4/2012 |
| WO | 2012/050187 | 4/2012 |
| WO | WO2012/050187 * | 4/2012 |
| WO | WO 2012/050187 * | 4/2012 |
| WO | 2012/121294 | 9/2012 |
| WO | WO2012/121294 * | 9/2012 |
| WO | WO 2012/121294 * | 9/2012 |
| WO | 2013/161754 | 10/2013 |
| WO | 2013/161755 | 10/2013 |

OTHER PUBLICATIONS

Japanese Office Action issued in Counterpart Patent Appl. No. 2013-160063, dated Jun. 27, 2017, along with an english translation thereof.

Japanese Office Action issued in Patent Appl. No. 2013-262407, dated Nov. 14, 2017, along with an english translation thereof.

* cited by examiner

DISPERSION SOLUTION FOR DRILLING AND METHOD OF EXTRACTING UNDERGROUND RESOURCES USING THE DISPERSION SOLUTION

TECHNICAL FIELD

This invention relates to a dispersion solution for drilling used for extracting underground resources such as petroleum, natural gases and the like relying on a well drilling method such as hydraulic fracturing method, rotary drilling method or riserless drilling method.

BACKGROUND ART

Well drilling methods such as hydraulic fracturing method, rotary drilling method and riserless drilling method have now been widely employed for extracting underground resources.

The rotary drilling method consists of forming the well by drilling while refluxing the mud and forming a filter cake called mud wall on the wall surfaces of the well using a finishing fluid blended with a water loss-preventing agent. The cake maintains the chute walls stable, prevents the chute walls from collapsing and reduces friction to the fluid flowing through the well.

The hydraulic fracturing method consists of pressurizing the fluid filled in the well to form cracks (fractures) in the vicinities of the well to thereby improve permeability in the vicinities of the well (for easy flow of the fluid) in an attempt to increase the effective sectional area through which the resources such as oils and gases flow into the well and, therefore, in order to improve productivity of the well.

Here, as the water loss-preventing agent that is added to the finishing fluid, there are chiefly used calcium carbonate or various kinds of salts in a granular form. However, use of the water loss-preventing agent brings about such problems that it becomes necessary to conduct a treatment with acid to remove it, or the water loss-preventing agent stays clogged in the stratum from where the resources are to be extracted hindering the production.

Further, the fluid used in the hydraulic fracturing method is also called fracturing fluid. So far, a viscous fluid like jelly gasoline was used. However, as the shale gas or the like gas has now been extracted from the shale layer that exists in relatively shallow places and by taking the effects on the environment into consideration, it is becoming a common practice to use an aqueous dispersion solution obtained by dissolving or dispersing chiefly a polymer in water. A known example of the polymer is polylactic acid (see a patent document 1).

That is, the polylactic acid is a substance that exhibits hydrolysable capability and biodegradable capability, and, even if it remains under the ground, is decomposed by water or enzyme in the ground and does not adversely affect the environment. Further, the water that is used as a dispersant, too, can be considered to be far from affecting the environment as compared to gasoline or the like.

The well is filled with the aqueous solution in which the polylactic acid has been dispersed and is pressurized so that the polylactic acid permeates to the vicinities of the well. Here, the polylactic acid undergoes the hydrolysis and loses the form of the resin. Therefore, spaces (or cracks) form in the portions where the polylactic acid had been permeated accounting for an increase in the space of the well into which the resources can flow.

Further, the polylactic acid also works as a water loss-preventing agent and suppresses the water used as the dispersion medium from permeating into the ground too much. Therefore, the polylactic acid offers an advantage of minimizing a change in the environment in the stratum. Besides, no treatment with acid is necessary since it decomposes in the ground.

In addition, the lactic acid which is decomposed from the polylactic acid is an organic acid. As the polylactic acid decomposes, the lactic acid is released. The lactic acid corrodes the shale layer and accelerates the shale layer to become porous.

However, though the polylactic acid undergoes the hydrolysis relatively quickly at high temperatures, its rate of hydrolysis becomes small as the temperature decreases. If used for extracting, for example, the shale gas from under the ground where the temperature is low, therefore, the efficiency of extraction becomes poor and improvements are desired.

On the other hand, a proposal has been made to use a polyglycolic acid in place of the polylactic acid (see a patent document 2).

The polyglycolic acid, too, has been known to be used as a biodegradable resin. Besides, its hydrolysable capability is higher than that of the polylactic acid; i.e., the rate of hydrolysis at a temperature of, for example, about 80° C. is considerably larger than that of the polylactic acid and can be effectively used to substitute for the polylactic acid.

However, the polyglycolic acid is considerably expensive as compared to the polylactic acid. This is a fatal defect when it is used for the hydraulic fracturing method that uses the fracturing fluid in large quantities. Besides, the polyglycolic acid does not decompose to a sufficient degree under specific temperature conditions.

PRIOR ART DOCUMENTS

Patent Documents

Patent document 1: U.S. Pat. No. 7,833,950
Patent document 2: WO2012-050187

OUTLINE OF THE INVENTION

Problems that the Invention is to Solve

It is, therefore, a problem of the present invention to provide a dispersion solution for drilling which exhibits a highly hydrolysable capability, is obtained by dispersing an inexpensive hydrolysable resin material in an aqueous medium, and is useful as a fracturing fluid when it is used as a finishing fluid at the time of drilling a well or when it is used for the hydraulic fracturing method.

Means for Solving the Problems

According to the present invention, there is provided a dispersion solution for drilling obtained by dispersing, in an aqueous medium, a hydrolysable resin material that contains a resin that is hydrolysable but sparingly and a hydrolysable resin that accelerates the decomposition of esters.

According to the present invention, further, there is provided a method of extracting underground resources through a well formed by drilling, comprising the step of introducing the dispersion solution for drilling into the well with pressure to hydrolyze the hydrolysable resin material in water at a temperature of not lower than 40° C.

In the dispersion solution for drilling of the present invention, it is desired that:

(1) The hydrolysable resin that accelerates the decomposition of esters releases an acid;
(2) The acid that is released is a glycolic acid and/or an oxalic acid;
(3) The hydrolysable resin that releases the acid is a polyoxalate;
(4) The resin that is hydrolysable but sparingly is a polylactic acid;
(5) The hydrolysable resin that accelerates the decomposition of esters is contained in an amount of not less than 30 parts by weight per 100 parts by weight of the resin that is hydrolysable but sparingly;
(6) An enzyme is, further, contained; and
(7) The enzyme is at least the one selected from protease, lipase and cutinase.

Effects of the Invention

In the dispersion solution for drilling of the present invention, the hydrolysable resin material dispersed in the aqueous medium comprises chiefly an inexpensive resin that is hydrolysable but sparingly as represented by the polylactic acid offering, therefore, a great advantage in the cost as compared to that of the prior art that uses the polyglycolic acid.

Besides, the present invention uses the hydrolysable resin (e.g., polyoxalate) that accelerates the decomposition of esters in addition to using the resin that is hydrolysable but sparingly. Therefore, it is allowed to greatly improve the hydrolysable capability of the resin that is hydrolysable but sparingly, i.e., to greatly improve its rate of hydrolysis at a temperature of, for example, not higher than 80° C. That is, the acid and alkali released from the hydrolysable resin that accelerates the decomposition of esters serve as catalysts to accelerate the hydrolysis of the polylactic acid and the like. Here, it can be contrived to directly add the acid and alkali instead of using the hydrolysable resin that accelerates the decomposition of esters. In this case, however, the hydrolysable resin undergoes the hydrolysis before it is filled in the well or is pressurized and cannot be put into practical use.

In extracting the underground resources, the temperature of the underground stratum where the underground resources are present seriously affects the extraction conditions. In the dispersion solution for drilling obtained by dispersing the hydrolysable resins in water, it has been desired that the hydrolysable resins have such hydrolysable capabilities that the reduction of weight thereof is about 40% (or more) in 4 days in a temperature range of not lower than 45° C. but not higher than 200° C. At present, in particular, resources are in many cases extracted from the stratum such as shale stratum that is present shallow under the ground. For instance, the resources in many cases have also been extracted from the stratum where the temperature is 40° C. to 80° C. and, specifically, 40° C. to 60° C.

The dispersion solution for drilling of the invention uses, as the hydrolysable resin material, the resin (e.g., polylactic acid) that is hydrolysable but sparingly and the hydrolysable resin (e.g., polyoxalate) that accelerates the decomposition of esters in combination, and satisfies the above-mentioned hydrolysable capability to a sufficient degree and, therefore, can be very favorably used as a finishing fluid for drilling wells and as a fracturing fluid for the hydraulic fracturing method.

Moreover, the dispersion solution for drilling of the invention contains the enzyme and exhibits highly hydrolysable capability at a temperature of not higher than 50° C. (i.e., not higher than a temperature at which the enzyme loses its activity) and, specifically, even in a temperature range of as low as 40 to 50° C., and is advantageous for extracting the resources from a shallow stratum.

That is, when the dispersion solution for drilling of the present invention is used as the finishing fluid, the filter cake which consists of solid components (water loss-preventing agent) such as calcium carbonate and the like formed on the wall surfaces of the well can be decomposed with the acid formed by the hydrolysis of the hydrolysable resin material eliminating the need of subsequently conducting the treatment with acid and, therefore, making it possible to quickly recover the water loss-preventing agent. Besides, the hydrolysable resin material (solid component) in the dispersion solution by itself works as the water loss-preventing agent. Namely, the filter cake consisting of the solid component prevents the loss of water from the well (prevents the water from permeating into the ground). After the passage of a predetermined period of time, the cake undergoes the hydrolysis eliminating, as a matter of course, the need of any special treatment with acid, and can, thereafter, be recovered.

The dispersion solution for drilling can also be used as the fracturing fluid. When the well is filled with the dispersion solution and is pressurized, the hydrolysable resin material permeates to the vicinities of the well. Even when the temperature in the ground is low, the hydrolysable resin material undergoes the hydrolysis in short periods of time. Therefore, spaces (cracks) of a pillar structure can be formed in the portions to where the resin material has permeated making it possible to improve the drilling efficiency for extracting, for example, the shale gas. Besides, the acid formed by the hydrolysis of the hydrolysable resin material dissolves minerals such as the shale accelerating the formation of cracks.

Further, the hydrolysable resin material in the dispersion solution also works as a filler for blocking the flow passage in the well but subsequently undergoes the hydrolysis, alleviating the problem of clogging due to the sedimentation of the filler and, therefore, enabling the production efficiency to be improved.

Further, upon blending the dispersion solution with a gelling agent such as chitosan that dissolves under the condition of a low pH, the acid formed by the hydrolysis of the hydrolysable resin material gives rise to the occurrence of gelation in the well causing the fluid to become highly viscous. This enables the solution to be effectively permeated into the vicinities of the well as the fluid is introduced therein with pressure. At the same time, the gel is decomposed (viscosity decreases) with the acid formed by the continuing hydrolysis and, therefore, the fracturing fluid can be effectively recovered.

MODES FOR CARRYING OUT THE INVENTION

The dispersion solution for drilling of the present invention is a dispersion solution obtained by dispersing the hydrolysable resin material in the aqueous medium and can, as required, be blended with a water-absorbing polymer or an enzyme. It can, further, be suitably blended with known additives that are used for drilling or hydraulically fracturing the wells.

<Hydrolysable Resin Materials>

The hydrolysable resin material used in the present invent contains a resin that is hydrolysable but sparingly and a hydrolysable resin that accelerates the decomposition of esters.

1. Resin that is Hydrolysable but Sparingly.

The resin that is hydrolysable but sparingly is a chief component of the resin material. Here, for example, the hydrolysable resin is freeze-pulverized and is dispersed in water to prepare an aqueous dispersion solution of a concentration of 1 mg/1 ml which is, thereafter, incubated at 45° C. for one week such that the TOC (total organic carbon amount) in the residue is not more than 5 ppm. Besides, no water-soluble polymer is contained. The water-soluble polymer (e.g., having a solubility in water of 20° C. of not less than 50 g/100 g) permeates too much into the ground to seriously affect the environment, and is not suited for being added to the fracturing fluid.

Examples of the resin that is hydrolysable but sparingly include polylactic acid, polyhydroxyalkanoate, polycaprolactone, polybutylene succinate, polybutylene succinate adipate, polybutylene terephthalate adipate, cellulose acetate and thermoplastic starches, which can be used in the form of copolymers or blends. Among them, the polylactic acid is most desired from the standpoint of cost.

The polylactic acid may be either a 100% poly-L-lactic acid or a 100% poly-D-lactic acid, or may be a molten blend of poly-L-lactic acid and poly-D-lactic acid, or a random copolymer or a block copolymer of L-lactic acid and D-lactic acid.

Further, the hydrolysable resin, so far as its properties are not impaired, can be used in the form of a copolymer being copolymerized with various kinds of aliphatic polyhydric alcohols, aliphatic polybasic acid, hydroxycarboxylic acid or lactone.

As the polyhydric alcohol, there can be exemplified ethylene glycol, propylene glycol, butanediol, octanediol, dodecanediol, neopentyl glycol, glycerin, pentaerythritol, sorbitan, and polyethylene glycol.

As the polybasic acid, there can be exemplified succinic acid, adipic acid, sebacic acid, glutaric acid, decanedicarboxylic acid, cyclohexanedicarboxylic acid and terephthalic acid. A carboxylic acid diester, too, can be used.

As the hydroxycarboxylic acid, there can be exemplified glycolic acid, hydroxypropionic acid, hydroxyvaleric acid, hydroxycaproic acid and manderic acid.

As the lactone, there can be exemplified caprolactone, butylolactone, valerolactone, propiolactone, undecalactone, glycolide, and mandelite.

As required, further, the sparingly hydrolysable resin may be blended with known additives such as plasticizer, heat stabilizer, photo stabilizer, antioxidant, ultraviolet ray absorber, flame retardant, coloring agent, pigment, filler, parting agent, antistatic agent, perfume, lubricant, foaming agent, antibacterial/antifungal agent, nucleating agent and the like.

The resin that is hydrolysable but sparingly should have a suitable degree of molecular weight from such a standpoint that it works as a filler when it is used as the fracturing fluid or from the standpoint of its permeability into the ground, and should, usually, have a weight average molecular weight in a range of 5,000 to 1,000,000 and, specifically, 10,000 to 500,000.

2. Hydrolysable Resin that Accelerates the Decomposition of Esters.

The above-mentioned hydrolysable resin, e.g., polylactic acid is sparingly hydrolysable, and undergoes the decomposition at temperatures of not higher than 100° C. and, specifically, not higher than 80° C. requiring very extended periods of time. Therefore, the present invention uses the following hydrolysable resin that accelerates the decomposition of esters.

The hydrolysable resin that accelerates the decomposition of esters (hereinafter often referred to simply as "ester-decomposing resin") by itself does not exhibit the ester-decomposing capability but, when used being mixed with water, works as a catalyst for decomposing esters or releases alkali.

The ester-decomposing resin exhibits a TOC of not less than 5 ppm as measured by the method mentioned above, and is obviously different from the sparingly hydrolysable resin.

The ester-decomposing resin, usually, has a weight average molecular weight of about 1,000 to about 200,000 so that it is homogeneously dispersed in the resin that is hydrolysable but sparingly and that it quickly accelerates the hydrolysis of the hydrolysable resin with the acid or alkali released from the ester-decomposing resin.

As the ester-decomposing resin that releases alkali, there can be used an alkali metal salt of acrylic acid such as sodium acrylate or a sodium alginate. However, since the alkali adversely affects the environment, the ester-decomposing resin that releases acid is particularly preferred.

The acid released from the acid-releasing ester-decomposing resin exhibits a pH (25° C.) of not higher than 4 and, specifically, not higher than 3 when it is in the form of an aqueous solution or an aqueous dispersion solution of a concentration of 0.005 g/ml. Preferably, there is used a polymer which, when mixed with water, easily undergoes the hydrolysis to release acid. The acid that is released may be oxalic acid or glycolic acid.

The polymer may be, for example, polyoxalate or polyglycolic acid. These polymers may be used in a single kind or in a combination of two or more kinds.

As the component for forming the copolymer, there can be exemplified polyhydric alcohols such as ethylene glycol, propylene glycol, butanediol, hexanediol, octanediol, dodecanediol, neopentyl glycol, glycerin, pentaerythritol, sorbitan, bisphenol A and polyethylene glycol; dicarboxylic acids such as succinic acid, adipic acid, sebacic acid, glutaric acid, decanedicarboxylic acid, cyclohexanedicarboxylic acid, terephthalic acid, isophthalic acid and anthracenedicarboxylic acid, and diesters thereof; hydroxycarboxylic acids such as glycolic acid, L-lactic acid, D-lactic acid, hydroxypropionic acid, hydroxybutyric acid, hydroxyvaleric acid, hydroxycaproic acid, manderic acid, and hydroxybenzoic acid; and lactones such as glycolide, caprolactone, butylolactone, valerolactone, propiolactone and undecalactone.

As required, further, the above ester-decomposing resins may be blended with known additives such as plasticizer, heat stabilizer, photo stabilizer, antioxidant, ultraviolet ray absorber, flame-retarding agent, coloring agent, pigment, filler, parting agent, antistatic agent, perfume, lubricating agent, foaming agent, antibacterial/antifungal agent and nucleating agent.

In the homopolymer, copolymer or blend thereof referred to in the specification, the polymer obtained by polymerizing the oxalic acid as at least one monomer is regarded to be a polyoxalate.

Specifically, the polyoxalate and the polyglycolic acid are hydrolysable resins that can be easily hydrolyzed, i.e., quickly undergo the hydrolysis, and excellently work to accelerate the hydrolysis of the sparingly hydrolysable resin. Among them, the polyoxalate and, specifically, the polyethylene oxalate works to very highly accelerate the hydrolysis as compared to the polyglycolic acid, can greatly accelerate the hydrolysis of the sparingly hydrolysable resin such as polylactic acid even at temperatures of not higher than 80° C., and is very cheaper than the polyglycolic acid offering great advantage in cost.

Further, though dependent upon its kind, the above ester-decomposing resin is used, desirably, in an amount of not less than one part by weight per 100 parts by weight of the sparingly hydrolysable resin from the standpoint of accelerating the hydrolysis and, specifically, in an amount of 30 to 300 parts by weight and, particularly, 30 to 200 parts by weight. If the amount of the ester-decomposing resin is too small, it becomes difficult to accelerate the decomposition of the resin that is hydrolysable but sparingly to a sufficient degree. At a temperature of, for example, about 80° C., a considerable period of time is required for the hydrolysis. If used in unnecessarily large amounts, further, it becomes unsatisfactory from the standpoint of cost. Besides, the rate of hydrolysis becomes so large that it becomes difficult to handle them as a fracturing fluid or as a water loss-adjusting agent.

3. Form of the Hydrolysable Resin Material.

In the invention, the biodegradable resin material contains the above-mentioned resin that is hydrolysable but sparingly (sparingly hydrolysable resin) and the hydrolysable resin that accelerates the decomposition of esters (ester-decomposing resin). The biodegradable resin material is formed, by forming means known per se., into pellets, granular material, pulverized material as obtained by pulverizing the films, or into fibers or capsules, and is dispersed in water.

That is, the sparingly hydrolysable resin represented by the polylactic acid and the ester-decomposing resin are made present in a dispersion solution in a state of being in close contact with each other, whereby the acid or the like released from the ester-decomposing resin accelerates the hydrolysis of the sparingly hydrolysable resin.

In the invention, further, the form of the resin material is not limited to the above-mentioned example only so far as the sparingly hydrolysable resin and the ester-decomposing resin are present in a state of being closely contacted to each other and are having suitable sizes. Particularly desirably, the resin material should have a shell/core structure in which the sparingly hydrolysable resin is forming shells and the ester-decomposing resin is forming cores. For instance, the fiber should, preferably, be a core/sheath fiber, the sparingly hydrolysable resin forming sheaths and the ester-decomposing resin forming cores. That is, upon employing the resin material of the shell/core structure, the hydrolysis takes place quickly in a stage where the water has permeated into the core portions, and the fracturing fluid can be handled very easily.

In the present invention, the hydrolysable resin material is, usually, made present in the aqueous dispersion solution in an amount of 0.01 to 20% by weight and, specifically, 0.01 to 10% by weight from the standpoint of smoothly drilling wells or for smoothly conducting the hydraulic fracturing.

<Water-Absorbing Polymer>

The invention can, further, use a water-absorbing polymer such as polyvinyl alcohol or CMC in addition to using the above-mentioned sparingly hydrolysable resin and the ester-decomposing resin. Upon being blended with the above water-soluble polymer, it is allowed to suppress the hydrolysis before conducting the hydraulic fracturing and to improve the handling of the fracturing fluid.

If used in too large amounts, however, the water-absorbing polymer may hinder the function of the ester-decomposing resin. Usually, therefore, the water-absorbing polymer is used in an amount of not more than 50 parts by weight and, specifically, in a range of 1 to 10 parts by weight per 100 parts by weight of the sparingly hydrolysable resin.

<Enzyme>

The dispersion solution for drilling of the invention can be, further, blended with an enzyme in addition to the above-mentioned hydrolysable resin material to maintain a highly decomposing capability at low temperatures of not higher than 50° C. For example, a solution obtained by dispersing the polylactic acid in water without, however, being blended with the enzyme retains the mass at a ratio far larger than 50% when it is held at a temperature of 45° C. for 96 hours (4 days). When blended with the enzyme, on the other hand, the solution retains the mass at a ratio of not less than 80% when it is held at a temperature of 45° C. for 3 hours, maintains good stability effectively avoiding such inconvenience that the resin undergoes the decomposition before the solution is filled in the well or before being pressurized. After held for 96 hours (4 days), the solution retains the mass at a ratio of not more than 50% and after held for 168 hours (7 days), the solution retains the mass at a ratio of not more than 20% featuring a very high hydrolyzing capability.

It will, therefore, be learned that the dispersion solution for drilling of the invention blended with the enzyme is very useful as a fracturing fluid for drilling at ground temperatures of not higher than 50° C.

The enzyme that is used is the one that is suited for the resin that can be decomposed with the enzyme. When there is used such a hydrolysable resin as polylactic acid, polyoxalate or polyglycolic acid, in particular, there can be preferably used protease, cellulose, cutinase, lipase, esterase, chitinase, xylanase and PHB depolymerase. Specifically, it is most desired to use at least any one of protease, cutinase or lipase.

These enzymes may or may not have been fixed. For instance, the Protease K manufactured by Wako Jun-yaku Co. or the like is used in the form of an aqueous solution. Further, microorganisms may be introduced to use an exoenzyme thereof. Or culture component or nutrient component necessary for the microorganisms may be added.

The above enzyme is, usually, used in an amount of 10 to 20 and, specifically, 25 to 100 parts by weight per 100 parts by weight of the hydrolysable resin material (i.e., the resin that can be decomposed with the enzyme) though the amount may differ depending on its kind.

<Other Additives>

In the invention, the aqueous dispersion solution in which the above hydrolysable resin material is dispersed can be blended with known additives that are used in the well drilling method or the hydraulic fracturing method.

In the case of the hydraulic fracturing method, for example, the aqueous dispersion solution may be blended with water-soluble polysaccharides (gelling agent) such as guar gum or chitosan as a viscosity-imparting agent or with a proppant that contains sand (supporting agent) so that cracks formed by the hydraulic fracturing will not be clogged.

The aqueous dispersion solution can be blended with a surfactant for dispersing the hydrolysable resin material and can, further, be blended with an acid or alkali in a suitable amount to suitably accelerate the hydrolysis of the hydrolysable resin material.

Further, a buffer solution may be added to suppress a change in the pH caused as the hydrolysable resin material undergoes the hydrolysis and to maintain stability in the hydrolysis at all times. As the buffer solution, there can be exemplified glycine-hydrochloric acid buffer solution, phosphoric acid buffer solution, tris-hydrochloric acid buffer solution, acetic acid buffer solution, citric acid buffer solution, citric acid-phosphoric acid buffer solution, boric acid buffer solution, tartaric acid buffer solution, glycine-sodium hydroxide buffer solution, carbonic acid-bicarbonic acid buffer solution, bistris buffer solution, Good's buffer solution (MES, ADA, PIPES, MOPS, HEPES, CHES), and Britton-Robinson buffer solution. It is, further, allowable to use a solid neutralizing agent in place of the buffer solution and to use water as the solvent. For example, there can be used calcium carbonate, chitosan, proton-removing ion-exchange resin and the like. The hydrolysis can also be conducted by adding the neutralizing agent to the reaction solution. As required, further, an organic solvent such as ethanol may be added.

Any of these additives may be added in such amounts that the hydrolysable resin material is dispersed in the above-mentioned amount in the aqueous dispersion solution and that the functions of the hydrolysable resins are not impaired.

The above-mentioned dispersion solution for drilling of the present invention is very useful as a finishing fluid that is used at the time of drilling a well or as a fracturing fluid used at the time of extracting underground resources by the hydraulic fracturing method.

These uses will now be described.

<Finishing Fluid>

In drilling a well by the rotary drilling method or the like method, it is necessary to fill the well with the finishing fluid in order to prevent the well from collapsing. The finishing fluid is blended with the grains of calcium carbonate or of various salts as the water loss-preventing agent. That is, by introducing the finishing fluid into the well with pressure, a filter cake of the water loss-preventing agent is formed on the wall surfaces of the well; i.e., the cake prevents the loss of the finishing fluid from the well (prevents the fluid from permeating into the vicinities of the well). At the time of extracting the resources, however, the water loss-preventing agent (filter cake) must be recovered to avoid a decrease in the productivity caused by the clogging. For this purpose, a treatment with an acid must be conducted.

When the dispersion solution for drilling of the present invention is used as the finishing fluid, the solid component (i.e., the hydrolysable resin material) in the dispersion solution works as the water loss-preventing agent, and a cake of the solid component forms on the wall surfaces of the well. The cake, however, collapses upon undergoing the hydrolysis after the passage of a predetermined period of time offering, therefore, an advantage in that no treatment with acid is necessary for recovering the cake. It is also allowable, as a matter of course, to blend the dispersion solution for drilling with the water loss-preventing agent such as calcium carbonate to increase the strength of the cake, i.e., to increase the water loss-preventing capability and, besides, to increase the function for preventing the well from collapsing. In this case, too, the acid formed by the hydrolysis of the hydrolysable resin material dissolves the water loss-preventing agent such as calcium carbonate and eliminates the need of the subsequent treatment with acid, which is an advantage.

When the dispersion solution for drilling of the present invention is to be blended with the water loss-preventing agent such as calcium carbonate, the water loss-preventing agent is added in an amount of, preferably, 10 to 150 parts by weight per 100 parts by weight of the hydrolysable resin material.

<Drilling by Hydraulic Fracturing>

In the present invention, the dispersion solution for drilling in which the hydrolysable resin material is dispersed is introduced with pressure into the underground so that the hydrolysable resin in the dispersion solution is hydrolyzed at a temperature of not lower than 40° C. For example, by conducting the hydraulic fracturing by using the dispersion solution as the fracturing fluid, it is allowed to extract the desired underground resources.

Concretely speaking, a vertical shaft is formed by drilling down to the stratum where the desired underground resources may be present. Next, the drilling is conducted in a horizontal direction to form a horizontal hole to thereby form the well.

The thus formed well is filled with the dispersion solution for drilling containing the proppant described above, and is pressurized to execute the fracturing. Due to applying the pressure, the hydrolysable resin material and the proppant permeate into the vicinities of the horizontal hole and where the hydrolysable resin material undergoes the hydrolysis and extinguishes forming pillar structures. The remaining dispersion solution is sucked and, thereafter, the underground resources such as gases and oils are recovered.

When the hydraulic fracturing is conducted by using the dispersion solution for drilling of the invention as the fracturing fluid, the hydrolysable resin material quickly decomposes even at a temperature of about 80° C. enabling the hydraulic fracturing to be efficiently conducted in short periods of time. The dispersion solution for drilling can, further, be used as a plug or a break down material in addition to being used as the fracturing fluid.

Further, when the well is drilled while refluxing the mud, the dispersion solution for drilling can be used as the water loss-adjusting agent in the finishing fluid eliminating the subsequent step of treatment with acid. Besides, neither clogging nor trouble in the production occurs.

Even if the resin permeates over unnecessarily wide areas and remains without being hydrolyzed, the resin is biodegradable and will not adversely affect the environment.

Further, when the dispersion solution for drilling is used as the fracturing fluid, the hydrolysable resin material hydrolyses in short periods of time forming spaces (cracks) of a pillar structure in the portions into where the resin material has permeated. Besides, the acid formed by the hydrolysis dissolves minerals such as the shale and accelerates the formation of cracks. As a result, the shale gas and the like can be extracted highly efficiently.

Further, the hydrolysable resin material in the dispersion solution can also be used as a filler for blocking the flow path in the well but, thereafter, undergoes the hydrolysis avoiding, therefore, the problem of clogging caused by the sedimentation of the filler and contributing to improving the production efficiency.

Here, the dispersion solution can be blended with a gelling agent such as chitosan that dissolves under a low pH condition in order to increase the viscosity of the fluid based on the gelation in the well. That is, the pH decreases due to the acid formed by the hydrolysis of the hydrolysable material, the gelling agent dissolves in the dispersion solution and, as a result, gelling takes place to increase the viscosity. Namely, by introducing the fluid with pressure, the liquid effectively permeates into the vicinities of the well and, besides, the proppant (support material) is efficiently transferred.

As the acid further increases due to the hydrolysis that continues, the gel quickly decomposes (acquires decreased viscosity) due to a further decrease in the pH, enabling the fracturing fluid to be effectively recovered and, hence, enhancing the productivity.

In the present invention, the dispersion solution for drilling is introduced with pressure into the well under the ground in the form of water in which are dispersed the hydrolysable resin material and other materials. It is, here, allowable to add oxygen subsequently. For instance, after the liquid or water containing the components other than the enzyme dispersed therein is introduced with pressure into the well, an aqueous solution containing the enzyme is fed subsequently.

The water that is used as the dispersion medium will be heated in the ground at a temperature depending on the position of the well and, therefore, may have been mixed with various materials at room temperature in advance or may have been mixed with other dispersing components in advance at not lower than 40° C. (but if the enzyme is to be added, then at not higher than 50° C. so that the enzyme will not lose its activity).

EXAMPLES

The invention will now be described by way of the following Examples.

In the Experiments, measurements were taken by the methods described below.

<Measuring the Melting Points and Glass Transition Temperatures>
Apparatus: DSC 6220 (differential scanning calorimeter) manufactured by Seiko Instruments Co.
Preparation of samples: Amount of samples, 5 to 10 mg.
Measuring conditions: Nitrogen atmosphere, elevating the temperature at a rate of 10° C./min. over a range of 0° C. to 250° C.

<Measuring the Molecular Weights>
Apparatus: Gel permeation chromatograph GPC
Detector: Differential refractive index detector RI (Model RI-2414 manufactured by Waters Co., sensitivity: 512)
Column: Shodex HFIP-LG (one unit), HFIP-806M (2 units), manufactured by Showa Denko Co.
Solvent: Hexafluoroisopropanol (5 mM sodium trifluoroacetate is added)
Flow rate: 0.5 mL/min.
Column temperature: 40° C.
Preparation of samples: 5 milliliters of a solvent was added to about 1.5 mg of a sample and the mixture thereof was mildly stirred at room temperature (sample concentration of about 0.03%). After having confirmed with the naked eye that the sample had been dissolved, the solvent was filtered using a 0.45 μm filter (repeated twice from the weighing). All samples were measured in about one hour from the start of preparation.

Synthesis of the polyethylene oxalate (hereinafter abbreviated as "PEOx").

Into a 1 L separable flask equipped with a mantle heater, a stirrer, a nitrogen introduction tube and a cooling tube, there were introduced:
dimethyl oxalate, 472 g (4 mols),
ethylene glycol, 297 g (4.8 mols), and
tetrabutyl titanate, 0.42 g,
and the temperature in the flask was elevated in a nitrogen stream from 120° C. up to 180° C. while distilling the methanol off to conduct the reaction for 7 hours. Finally, 270 ml of methanol was distilled off.

Thereafter, the temperature therein was elevated stepwise to 170° C. to 190° C. to conduct the reaction for 7 hours under a reduced pressure of 0.1 kPa to 0.2 kPa. Since the viscosity has increased, the reaction product was taken out.

The polymer that was taken out was granulated by using a crusher, and was dried in vacuum at 110° C. for 4 hours so as to be crystallized.

The obtained polymer possessed a weight average molecular weight of 70,000, a melting point of 180° C. and a glass transition temperature of 35° C.

<Preparation of PLA Pellets Containing Ester-Decomposing Resin (Hydrolysable Resin Material)>

A polylactic acid (PLA: 4032D manufactured by Natureworks Co.) was dry-blended with the PEOx. By using a biaxial extruder (ULT Nano 05-20AG manufactured by Technovel Co.), the mixture thereof was melted at 200° C. to prepare master pellets thereof which were then used as a sample.

<Hydrolyzing Test>

A piece of pellet prepared above was added to 10 ml of a dispersant in a 25-ml vial which was then stored still at each of the temperatures. After stored for 4 days, the pellet was taken out, dried in a vacuum drier heated at 60° C. for 4 hours, measured for its weight and was measured for its ratio of decomposition. The ratio of decomposition was calculated according to the following formula, Ratio of decomposition=(initial weight−weight after decomposed)×100/initial weight The samples having ratios of decomposition of not more than 40% were judged to be × whereas the samples having ratios of decomposition exceeding 40% were judged to be ◯.

As the dispersants, there were used distilled water, guar gum aqueous solution (aqueous solution containing 0.7 wt % of guar gum) and alkaline aqueous solution (aqueous solution containing 1 wt % of sodium hydroxide) to evaluate the hydrolyzing capabilities.

Examples 1 to 13, Comparative Examples 1 to 5

There were prepared pellets of the hydrolysable resin materials containing the polyethylene oxalate (PEOx) in amounts (% by weight) as shown in Table 1 per the polylactic acid (PLA). The pellets were dispersed in the dispersion solutions of temperatures (decomposition temperatures) shown in Table 1 and were evaluated for their hydrolysable capabilities to obtain the results as shown in Table 1.

TABLE 1

|  | PEOx content (wt %) | Dispersion solution | Decomposition temperature | Ratio of decomposition |
| --- | --- | --- | --- | --- |
| Experiment 1 | 30 | distilled water | 80 | ◯ |
| Experiment 2 | 40 | distilled water | 55 | ◯ |

TABLE 1-continued

| | PEOx content (wt %) | Dispersion solution | Decomposition temperature | Ratio of decomposition |
|---|---|---|---|---|
| Experiment 3 | 60 | distilled water | 55 | ○ |
| Experiment 4 | 40 | distilled water | 70 | ○ |
| Experiment 5 | 60 | distilled water | 70 | ○ |
| Experiment 6 | 40 | quar gumaq. sol. | 55 | ○ |
| Experiment 7 | 60 | quar gumaq. sol. | 55 | ○ |
| Experiment 8 | 40 | quar gumaq. sol. | 70 | ○ |
| Experiment 9 | 60 | quar gumaq. sol. | 70 | ○ |
| Experiment 10 | 5 | alkaliaq. sol. | 55 | ○ |
| Experiment 11 | 20 | alkaliaq. sol. | 55 | ○ |
| Experiment 12 | 40 | alkaliaq. sol. | 55 | ○ |
| Experiment 13 | 60 | alkaliaq. sol. | 55 | ○ |
| Comp. Ex. 1 | 0 | distilled water | 80 | X |
| Comp. Ex. 2 | 0 | distilled water | 55 | X |
| Comp. Ex. 3 | 0 | distilled water | 70 | X |
| Comp. Ex. 4 | 0 | quar gumaq. sol. | 55 | X |
| Comp. Ex. 5 | 0 | quar gumaq. sol. | 70 | X |

<Experiment 14>

As the hydrolysable resin materials, there were prepared pellets of the polylactic acid (PLA) and pellets of a mixed resin (PLA containing 40% of PEOx) comprising the PLA and the polyethylene oxalate (PEOx) in an amount of 40% by weight per the PLA.

The pellets of these hydrolysable resin materials were, respectively, dried in vacuum at 120° C. for 3 hours so as to be crystallized.

14 Milligrams of the above pellets and 10 ml of distilled water were put into a 25-ml vial. The vial was then put into an oven maintained at 70° C. and was stored still. After stored for 4 days, the pellets were recovered, dried, and measured for their weights to calculate the ratios of decomposition. The results were as shown in Table 2 below.

TABLE 2

| | | Ratio of decomposition (%) | |
|---|---|---|---|
| | | 0 day | After 4 days |
| 70° C. | PLA containing 40% of PEOx | 0 | 43 |
| | PLA | 0 | 0 |

Further, the pellets were measured for their molecular weights (Mw) before and after the hydrolyzing test. The results were as shown in Table 3.

Figure 1:
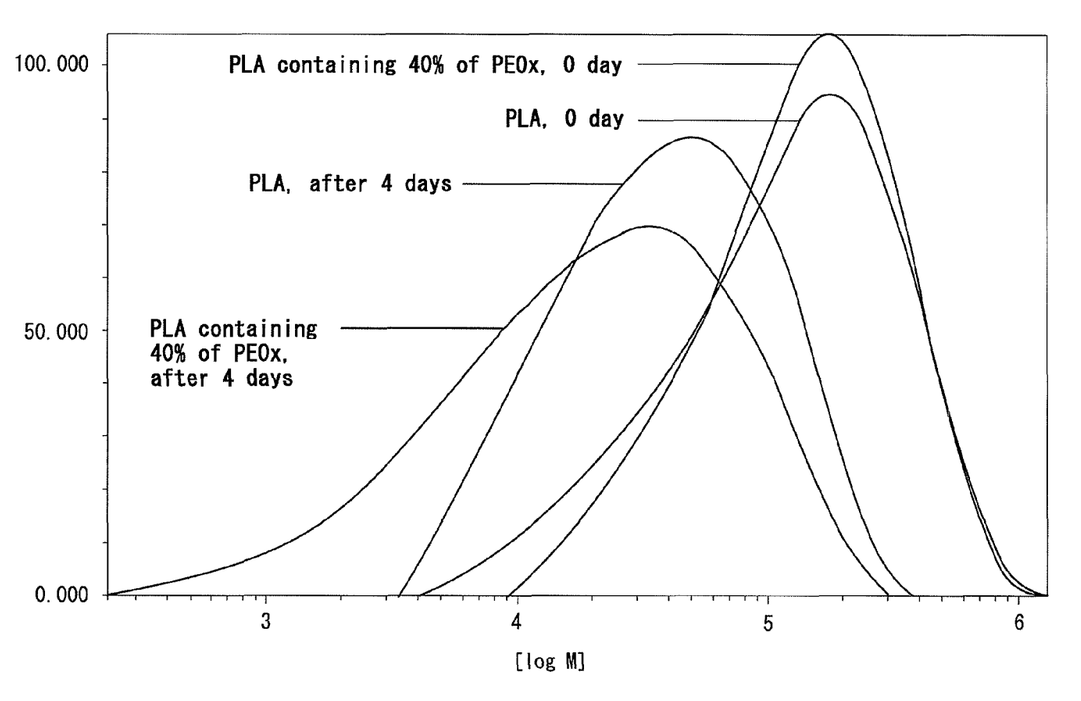
FIG. 1 is a diagram showing distributions of molecular weights of the samples after the hydrolysis testing in Example 14.

FIG. 1 shows the distributions of molecular weights of the pellets before the hydrolyzing test and after the hydrolyzing test (4 days thereafter) as measured by the GPC. The samples were those dissolved in a solvent of chloroform at a concentration of 3 mg/ml and filtered.

Measuring the Chloroform Solutions by the GPC:

As the GPC, there was used HLC-8120 manufactured by Toso Co. with the column of TSKgel Super HM-Hx2 and the guard column of TSKguard column Super H-H. The temperature of the column oven was maintained at 40° C., and a chloroform was used as the eluent being flown at a flow rate of 0.5 ml/min. The sample was poured in an amount of 20 μl. As the standard, there was used a polystyrene dissolved in the chloroform.

TABLE 3

| | Molecular weight Mw | |
|---|---|---|
| | 0 day | After 4 days |
| PLA containing 40% of PEOx | 180,000 | 3,700 |
| PLA | 180,000 | 5,700 |

When the pellets were pushed by a finger after the hydrolyzing test, the PLA did not collapse but the PLA containing 40% of PEOx collapsed easily due to pores and decreased molecular weight caused by the hydrolysis.

It will, therefore, be learned that the PLA containing the PEOx effectively works as a filler for filling the well and, thereafter, undergoes the hydrolysis with the passage of time and easily collapses due to the pressure in the well.

The residual PLA containing the PEOx after collapsed can be easily recovered together with water in the well.

<Experiment 15>

As the hydrolysable resin materials, there were prepared pellets of the polylactic acid (PLA), pellets of a mixed resin (PLA containing 5% of PEOx) comprising the PLA and the polyethylene oxalate (PEOx) in an amount of 5% by weight per the PLA, and pellets of a mixed resin (PLA containing 40% of PEOx) comprising the PLA and the polyethylene oxalate (PEOx) in an amount of 40% by weight per the PLA.

The pellets of these hydrolysable resin materials were, respectively, dried in vacuum at 120° C. for 3 hours so as to be crystallized.

450 Milligrams of the above pellets, 250 mg of calcium carbonate and 50 μl of water were put into a 25-ml vial, and were maintained still at 120° C. for 3 hours. Thereafter, 10 ml of water was added thereto and after 3 hours have passed, the liquid was picked up and was measured for the amounts of calcium lactate and oxalic acid by the HPLC. The results were as shown in Table 4.

TABLE 4

| | Calcium lactate (mg) | Oxalic acid (mg) |
|---|---|---|
| PLA | 0.24 | 0 |
| PLA containing 5% of PEOx | 4.8 | 0.08 |
| PLA containing 40% of PEOx | 6.4 | 0.02 |

As will be understood from the above results, the PLA containing the PEOx forms the calcium lactate in an amount larger by 20 times or more than the PLA. It will, therefore, be learned that the PLA containing the PEOx works to quickly dissolve minerals containing the calcium components such as the shale and the like, and is highly utilizable as the so-called acid fracturing.

Here, according to the above results, almost no oxalic acid has been eluted out indicating the probability that it might have precipitated as the calcium oxalate. Therefore, an experimental system was set up excluding the calcium carbonate to measure the amount of the oxalic acid that has eluted out.

450 Milligrams of the above-mentioned crystallized pellets and 50 μl of water were put into the 25-ml vial, and were left to stand still at 120° C. for 3 hours. Thereafter, 10 ml of water was added thereto and after 3 hours have passed, the liquid was picked up and was measured for the amount of the oxalic acid by the HPLC. The results were as shown in Table 5.

TABLE 5

|  | Oxalic acid (mg) |
| --- | --- |
| PLA | 0 |
| PLA containing 5% of PEOx | 4.6 |

From the above results, it was recognized that the oxalic acid has eluted out even from the PLA containing 5% of PEOx. Namely, in the system in which the calcium carbonate is mixed, the oxalic acid is precipitated mostly as the calcium oxalate from the PLA containing 40% of PEOx. It is, therefore, learned that to obtain the capability of acid fracturing, the PEOx should be desirably contained in an amount of less than 40%.

<Experiment 16>

The PLA pellets and the PLA pellets containing 5% of the PEOx were dried in vacuum at 120° C. for 3 hours so as to be crystallized, and were freeze-pulverized to obtain samples of the crystalized powders thereof.

450 Milligrams of the above crystalized powders and 50 μl of water were put into the 25-ml vial, and were left to stand still at 120° C. for 3 hours. Thereafter, 10 ml of water was added thereto and after 3 hours have passed, the liquid was picked up and was measured for the amount of the lactic acid by the HPLC. The results were as shown in Table 6.

TABLE 6

|  | Lactic acid (mg) | Oxalic acid (mg) |
| --- | --- | --- |
| PLA | 0.5 | 0 |
| PLA containing 5% of PEOx | 20 | 4.6 |

As will be understood from the above results, the crystallized powder of the PLA containing 5% of the PEOx eluted out the lactic acid 20 times as great (decomposition rate of 20 times as great) as that of the PLA. Namely, by being used together with the calcium carbonate, the above crystalized powder can be excellently used for forming a filter cake that can be self-decomposed (i.e., having properties as a water loss-preventing agent). It will, therefore, be learned that the dispersion solution for drilling of the present invention can be favorably used as a finishing fluid.

<Experiment 17>

There were prepared crystalized pellets of the PLA and crystalized pellets of the PLA containing 40% of the PEOx in quite the same manner as in Example 14.

5 Milliliters of water, 0.2 g of the chitosan (gelling agent) and 1 g of the above crystalized pellets were put into the 25-ml vial, placed in an oven heated at 70° C. and were stored still therein to observe a change in the fluidity with the passage of time.

The liquids that were gelled and lost fluidity were evaluated to be ○, the liquids that exhibited fluidity but possessed viscosity larger than that water were evaluated to be Δ, and the liquids equivalent to water were evaluated to be x. The results were as shown in Table 7.

TABLE 7

|  | After 1 hour | After 6 hours | After 12 hours |
| --- | --- | --- | --- |
| PLA | X | X | X |
| PLA containing 40% of PEOx | X | Δ | ○ |

At 70° C., the PLA did not undergo the hydrolysis and released no lactic acid. Therefore, the pH of the liquid was not lowered, the chitosan was not dissolved, and no gelation took place.

The PLA containing 40% of the PEOx, on the other hand, underwent the hydrolysis at 70° C. causing the pH to decrease due to the oxalic acid that was released, and dissolving the chitosan so as to be gelled.

If the amount of the oxalic acid is large, it has been known that the solution that was once gelled acquires an increased fluidity again. Therefore, by either increasing the content of the PEOx or throwing in the PEOx-containing PLA in an increased amount, it is allowed to obtain a fracturing fluid that can be gelled in a low temperature zone without necessitating any gel breaker.

<Confirming the Hydrolyzing Capability with an Enzyme>

The following experiments were conducted to make sure to what extent the hydrolysable capability of the hydrolysable resin material was improved by the addition of an enzyme.

In these experiments, the hydrolysable capability was confirmed by the methods described below.

Evaluating the Hydrolysable Capability:

15 Milligrams of master pellets prepared as described later were added together with an enzyme of a predetermined amount to 10 ml of a dispersion medium in a 25-ml vial, and were stored still at a temperature of 45° C. The pellets were taken out after the passage of time of 3 hours, 96 hours (4 days) and 168 hours (7 days), dried in a vacuum drier maintained at 60° C. for 4 hours, measured for their weights and measured for their weight retaining ratios. The weight retaining ratios were calculated according to the following formula.

Weight retaining ratio=100−((initial weight−weight after decomposed)×100/initial weight)

The hydrolysable resin materials were evaluated to be ○ when their weight retaining ratios after 3 hours, after 96 hours and after 168 hours were, respectively, not less than 80%, not more than 50% and not more than 20%, were evaluated to be Δ when their weight retaining ratios were, respectively, not less than 70% but less than 80%, exceeding 50% but not more than 60%, and exceeding 20% but not more than 30%, and were evaluated to be X when the above values were not attained.

Preparation of the Hydrolysable Resin Materials:

A polylactic acid (PLA), a polybutylene succinate (PBS: GS PLa AZ91 manufactured by Mitsubishi Kagaku Co.) and a polybutylene succinate adipate (PBSA: GS PLa AD92 manufactured by Mitsubishi Kagaku Co.), or a blend thereof with the PEOx (weight ratio of 95:5) were melted and mixed together by using a biaxial extruder (ULT Nano 05-20AG manufactured by Technovel Co.) at 200° C. to prepare master pellets thereof so as to be used as a sample hydrolysable resin material.

<Experiments 18 to 34>

The obtained sample hydrolysable resin materials were added to the dispersion medium to evaluate their hydrolysable capabilities. The descriptions in Table state the following. The hydrolysable capabilities were evaluated as shown in Table 8

Dispersion Medium:
    CHES: 100 mM CHES buffer solution, pH 10.5, 10 ml
    Phosphoric acid: 100 mM phosphoric acid buffer solution, pH 7.0, 10 ml
    Alkali: 0.1 wt % sodium hydroxide aqueous solution, 10 ml Viscosity-Imparting Agent:
    Guar gum: guar gum, 70 mg Enzymes:
    Savinase: Savinase 16.0 L (manufactured by Novozymes Co.), 35 µl
    Lipase C32: *Cryptococcus* sp. S-2-derived lipase C32 (manufactured by the National Research Institute of Brewing), 48 µl

TABLE 8

| | *1 | *2 | *3 | *4 | Enzyme | *5 | *6 | *7 |
|---|---|---|---|---|---|---|---|---|
| Exp. 18 | PLA | — | CHES | — | savinase | o | o | o |
| Exp. 19 | PLA | — | CHES | guar gum | savinase | o | o | o |
| Exp. 20 | PLA | PEOx | CHES | — | savinase | o | o | o |
| Exp. 21 | PLA | PEOx | CHES | guar gum | savinase | o | o | o |
| Exp. 22 | PLA | PEOx | alkali | — | savinase | o | o | Δ |
| Exp. 23 | PLA | — | CHES | — | — | o | x | x |
| Exp. 24 | PLA | PEOx | CHES | — | — | o | x | x |
| Exp. 25 | PLA | — | alkali | — | — | o | x | x |
| Exp. 26 | PLA | PEOx | alkali | — | — | o | x | x |
| Exp. 27 | PBS | — | phosphoric acid | — | lipase CS2 | o | o | o |
| Exp. 28 | PBS | — | phosphoric acid | guar gum | lipase CS2 | o | o | o |
| Exp. 29 | PBS | PEOx | phosphoric acid | — | lipase CS2 | o | o | o |
| Exp. 30 | PBS | PEOx | phosphoric acid | guar gum | lipase CS2 | o | o | o |
| Exp. 31 | PSBA | — | phosphoric acid | — | lipase CS2 | o | o | o |
| Exp. 32 | PSBA | — | phosphoric acid | guar gum | lipase CS2 | o | o | o |
| Exp. 33 | PSBA | PEOx | phosphoric acid | — | lipase CS2 | o | o | o |
| Exp. 34 | PSBA | PEOx | phosphoric acid | guar gum | lipase CS2 | o | o | o |

*1: Sparingly hydrolysable resin,
*2: Ester decomp. accel. hydrolysable resin (5 wt %),
*3: Dispersion medium,
*4: Viscosity-imparting agent,
*5: Mass retaining ratio after 3 hours,
*6: Mass retaining ratio after 96 hours,
*7: Mass retaining ratio after 168 hours

The invention claimed is:

1. A method of extracting underground resources through a well formed by drilling, comprising:
preparing a hydrolysable resin material composed of a mixture of 100 parts by weight of polylactic acid and not less than 40 parts by weight of polyoxalate;
introducing the hydrolysable resin material and an enzyme into water that contains no organic solvent to prepare a dispersion solution for drilling; and
introducing the dispersion solution for drilling into the well with pressure to hydrolyze the hydrolysable resin material in water at a temperature of from 40° C. to 50° C.

2. The method of extraction according to claim 1, wherein the dispersion solution for drilling is introduced into the well with pressure to form a filter cake of solid components contained in the dispersion solution on the wall surfaces of the well, and said filter cake is decomposed with an acid released by the hydrolysis of the hydrolysable resin material.

3. The method of extraction according to claim 1, wherein minerals in the vicinities of the well are dissolved with the acid produced by the hydrolysis of the hydrolysable resin material to thereby form cracks in the vicinities of the well.

4. The method of extraction according to claim 1, wherein the well is filled with the hydrolysable resin material.

5. The method of extraction according to claim 1, wherein the dispersion solution for drilling is blended with a gelling agent, a gel is formed in the well with the acid released by the hydrolysis of the hydrolysable resin material and, thereafter, the gel is decomposed.

6. The method of extraction according to claim 1, wherein the enzyme is at least the one selected from protease, lipase and cutinase.

* * * * *